(12) United States Patent
Herud

(10) Patent No.: US 9,028,181 B2
(45) Date of Patent: May 12, 2015

(54) EXPANSION CHUCK FOR LOSS-FREE TRANSMISSION OF A LUBRICATING MEDIUM

(75) Inventor: Josef K. Herud, Herzogenaurach (DE)

(73) Assignee: Kennametal Inc., Latrobe, PA (US)

( * ) Notice: Subject to any disclaimer, the term of this patent is extended or adjusted under 35 U.S.C. 154(b) by 792 days.

(21) Appl. No.: 13/304,912

(22) Filed: Nov. 28, 2011

(65) Prior Publication Data

US 2013/0015627 A1      Jan. 17, 2013

(30) Foreign Application Priority Data

Dec. 23, 2010   (DE) .......................... 10 2010 055 762

(51) Int. Cl.
| | | |
|---|---|---|
| *B23Q 11/10* | (2006.01) | |
| *B23B 31/30* | (2006.01) | |
| *B23B 31/02* | (2006.01) | |

(52) U.S. Cl.
CPC ......... *B23B 31/305* (2013.01); *Y10T 279/3493* (2015.01); *Y10T 279/10* (2015.01); *Y10T 409/304032* (2015.01); *Y10T 279/17111* (2015.01); *Y10T 279/3487* (2015.01); *Y10T 408/44* (2015.01); *B23B 31/028* (2013.01); *B23B 2250/12* (2013.01); *B23Q 11/1023* (2013.01)

(58) Field of Classification Search
CPC .. B23B 31/028; B23B 51/06; B23B 2250/12; B23B 31/305; B23C 5/28; B23Q 11/10; B23Q 11/1015; B23Q 11/1023
USPC ........... 279/20, 156, 4.03, 4.06, 4.11; 408/56, 408/57, 59; 409/135, 136
IPC ........................................................ B23Q 11/10
See application file for complete search history.

(56) References Cited

U.S. PATENT DOCUMENTS

| | | | |
|---|---|---|---|
| 3,364,800 A | 1/1968 | Benjamin et al. | |
| 4,213,354 A | 7/1980 | Dahinden | |
| 4,955,264 A | 9/1990 | Armbrust | |
| 5,137,289 A | * 8/1992 | Butikofer | ....................... 279/156 |
| 5,301,962 A | * 4/1994 | Killinger et al. | ........... 279/105.1 |

(Continued)

FOREIGN PATENT DOCUMENTS

| | | |
|---|---|---|
| CA | 2136923 C | 3/2007 |
| DE | 102004063739 A1 * | 7/2006 |

(Continued)

OTHER PUBLICATIONS

"MMS-Bearbeitungstechnologie—Teil 1: Begriffe und Definitionen", Draft Resolution Standard, DIN 69090-1, Dec. 2011, pp. 1-9, Germany.

(Continued)

*Primary Examiner* — Eric A Gates
(74) *Attorney, Agent, or Firm* — Larry R. Meenan

(57) ABSTRACT

A tool holder has a body with a spindle side for fastening the tool holder to a spindle of a machine tool and a tool side for accommodating a tool and has a lubricating media passage from the spindle side to the tool side that contains a lubricating media bush adjustable in the axial direction in the body. The lubricating media bush opens out on the tool side of the body, wherein a guide for the lubricating media hush is provided in the body. The guide contains a fitting section in which the lubricating media bush is adjustably guided, wherein a seal is provided which seals the lubricating media bush relative to the body.

18 Claims, 2 Drawing Sheets

(56) References Cited

U.S. PATENT DOCUMENTS

| | | | |
|---|---|---|---|
| 5,984,595 A * | 11/1999 | Mizoguchi | 408/57 |
| 6,270,086 B1 * | 8/2001 | Lloyd | 279/51 |
| 6,305,696 B1 * | 10/2001 | Sugata et al. | 279/20 |
| 6,572,119 B2 * | 6/2003 | Selb | 279/52 |
| 6,644,900 B1 * | 11/2003 | Sugata et al. | 409/136 |
| 6,926,478 B2 * | 8/2005 | Sugata et al. | 409/136 |
| 7,048,481 B2 * | 5/2006 | Sugata et al. | 409/136 |
| 7,090,448 B2 * | 8/2006 | Stoll et al. | 409/136 |
| 7,156,589 B2 * | 1/2007 | Sugata et al. | 409/136 |
| 7,160,067 B2 * | 1/2007 | Perry et al. | 409/234 |
| 7,192,228 B2 * | 3/2007 | Haenle et al. | 409/234 |
| 7,914,010 B2 * | 3/2011 | Herud | 279/4.06 |
| 8,360,695 B2 * | 1/2013 | Haenle | 408/57 |
| 8,714,893 B2 * | 5/2014 | Taguchi et al. | 409/234 |
| 8,740,519 B2 * | 6/2014 | Stoll et al. | 409/136 |
| 2003/0103819 A1 * | 6/2003 | Sugata et al. | 408/57 |
| 2003/0193148 A1 * | 10/2003 | Haag et al. | 279/4.03 |
| 2006/0029479 A1 * | 2/2006 | Stoll et al. | 409/136 |
| 2006/0029482 A1 * | 2/2006 | Stoll et al. | 409/136 |
| 2007/0014647 A1 * | 1/2007 | Watzke et al. | 409/136 |
| 2007/0145692 A1 * | 6/2007 | Herud | 279/2.06 |
| 2008/0185793 A1 * | 8/2008 | Haimer et al. | 279/2.06 |
| 2010/0148454 A1 * | 6/2010 | Haenle | 279/20 |
| 2012/0189397 A1 * | 7/2012 | Bozkurt | 409/135 |
| 2012/0211950 A1 * | 8/2012 | Matheis | 279/20 |

FOREIGN PATENT DOCUMENTS

| | | | | |
|---|---|---|---|---|
| DE | 102005015787 A1 * | 10/2006 | | |
| DE | 102005043823 A1 * | 3/2007 | | |
| EP | 0979155 B1 | 6/2003 | | |
| EP | 1813369 A1 * | 8/2007 | | |
| JP | 08099245 A * | 4/1996 | | B23Q 3/12 |
| JP | 08118119 A * | 5/1996 | | B23B 31/20 |
| JP | 08118197 A * | 5/1996 | | B23B 11/10 |
| JP | 08141878 A * | 6/1996 | | B23Q 11/10 |
| JP | 10138024 A * | 5/1998 | | B23B 31/20 |
| JP | 2000042814 A * | 2/2000 | | B23B 31/20 |
| JP | 2004050337 A * | 2/2004 | | B23Q 11/10 |
| JP | 2005131765 A * | 5/2005 | | B23B 31/20 |
| WO | WO 2005044489 A1 * | 5/2005 | | B23B 31/02 |
| WO | WO 2007042020 A2 * | 4/2007 | | |
| WO | WO 2009135660 A1 * | 11/2009 | | B23B 31/02 |

OTHER PUBLICATIONS

"MMS-Bearbeitungstechnologie—Teil 2: Maschine", Draft Resolution Standard, DIN 69090-2, Dec. 2011, pp. 1-19, Germany.

"MMS-Bearbeitungstechnologie—Teil 3: Werkzeuge und Werkzeugsysteme", Draft Resolution Standard, DIN 69090-3, Dec. 2011, pp. 1-33, Germany.

* cited by examiner

EXPANSION CHUCK FOR LOSS-FREE TRANSMISSION OF A LUBRICATING MEDIUM

BACKGROUND OF THE INVENTION

1. Field of the Invention

The invention relates to a tool holder in which a tool can be clamped in place, for example a drill or a milling cutter. The invention relates in particular to an expansion chuck which is suitable for minimum quantity lubrication machining technology (MQL machining technology).

2. Description of the Related Art

In MQL machining technology, an MQL medium (oil/air mixture, e.g. aerosol) is fed to the active location of the tool (tool cutting edge). In this case, the MQL medium is almost completely used up during the machining. The quantity which is used depends on the process. It is generally up to 50 ml/process hour. The working pressure is at most 10 bar as a rule. During conventional wet machining, on the other hand, several hundreds of liters of emulsion are transferred per process hour.

The MQL machining technology is described in a new draft resolution standard DIN 69090 part 1 to 3 which is currently in preparation for adoption as a standard publication (white copy).

In order to be able to optimally utilize the advantages of MQL machining technology, losses of lubricating medium must be avoided in the entire MQL system (all the components participating in the MQL machining technology in their entirety). However, it is not easy in practice, at the transition from the machine tool to the tool holder and at the transition from the tool holder to the tool, to ensure such a tight connection that the escape of lubricating medium, which is under a pressure of up to 10 bar, is prevented. There is also the added problem that different tools are clamped in place in the tool holder.

The object of the invention is to provide a tool holder which permits loss-free passage for a lubricating medium up to the tool cutting edge and is suitable in particular for MQL machining technology with MQL medium.

SUMMARY OF THE INVENTION

To achieve this object, a tool holder comprising a body which has a spindle side for fastening the tool holder to a spindle of a machine tool and a tool side for accommodating a tool and comprising a lubricating media passage from the spindle side to the tool side is provided according to the invention, wherein a lubricating media bush adjustable in the axial direction is arranged in the body, said lubricating media bush opening out on the tool side of the body, wherein a guide for the lubricating media bush is provided in the body, said guide containing a fitting section in which the lubricating media bush is adjustably guided, and wherein a seal is provided which seals the lubricating media bush relative to the body. In this way, reliable sealing of the lubricating media bush directly relative to the body can be achieved surprisingly easily and prevents MQL medium from undesirably escaping even at pressures up to 10 bar.

According to one embodiment, the seal is fixedly arranged in the body and seals with respect to the lubricating media bush, which is accommodated in the seal in an axially displaceable manner. The use of a seal fixedly arranged in the housing brings advantages to the effect that the seal can be made comparatively large.

The guide also preferably contains a sealing section which is stepped relative to the fitting section and in which the seal is accommodated. In this way, a radially extending step between the sealing section and the fitting section can easily be obtained, against which step the seal can be restrained in the axial direction. As a result, it is precisely positioned in the axial direction.

The seal is preferably embodied as a hollow cylinder, the outer surface of which is clamped directly into the sealing section. This results in sealing over a large area between the outer side of the lubricating media bush and the inner wall of the seal.

According to a preferred embodiment, the lubricating media passage of the seal is widened in a funnel shape on the spindle side. As a result, optimized flow of the MQL medium is ensured.

According to an alternative configuration, the seal is fixedly mounted on the lubricating media bush and seals with respect to the body. This permits an especially compact design.

In this case, the seal is preferably vulcanized onto the outer side of the lubricating media bush or is mechanically fastened in a similar manner. This leads to especially reliable sealing.

According to one embodiment, an HSK transfer unit is provided which is fitted in the body and opens out on the spindle side. The HSK transfer unit provides for reliable transfer of the MQL medium from the machine tool spindle.

The seal is preferably fitted between the transfer unit and a radially extending step which is provided between the sealing section and the fitting section of the guide. In this way, no separate measures are necessary for fixing the seal in the axial direction in the sealing section of the guide.

In order to prevent the undesirable escape of MQL medium in the region of the transfer unit, a sealing ring is preferably provided between the transfer unit and the body.

The diameter of the lubricating media passage of the transfer unit on the side facing the seal is preferably at least as large as the diameter of the lubricating media passage of the seal on the side facing the transfer unit. This design is a partial feature of a preferred configuration in which the lubricating media passage has no widened portion at all from the spindle side of the tool holder to the tool side. If the lubricating media passage, as viewed in the direction of flow of the lubricating medium, were to widen suddenly, this would lead to a local decrease in the flow velocity. As a result, there would be the risk of lubricant being deposited at this location, and this lubricant would then not be available for the lubrication at the tool cutting edges. This could have an adverse effect just on account of the very small lubricant quantities which are delivered to the tool during minimum quantity lubrication.

The lubricating media passage of the lubricating media bush is preferably widened in a funnel shape at the spindle-side end. This ensures that no abrupt reductions in cross section disturb the flow of the lubricant.

The seal is preferably made of an elastomer, rubber or a similar sealing material. When selecting the material, care must only be taken to ensure that it is oil-resistant.

An adjusting mechanism is preferably provided with which the lubricating media bush can be adjusted in the axial direction in the body. In this way, even in different tools, a loss-free, leakproof transfer of the lubricating medium to the tool can be ensured by adjusting the lubricating media bush in the axial direction. Even if the tool is shortened by regrinding, the requisite overall length can be ensured by axial adjustment of the lubricating media bush.

The adjusting mechanism preferably has a tooth system on the outer side of the lubricating media bush and an adjusting screw which engages in the tooth system. With this design, the lubricating media bush can be axially adjusted in a very sensitive manner by turning the adjusting screw. At the same time, the adjusting mechanism is self-locking, and therefore no separate locking of the lubricating media bush is necessary.

The tool holder can have in particular an expansion chuck for accommodating the tool, with which a tool can be clamped in place in an especially precise manner.

BRIEF DESCRIPTION OF THE DRAWINGS

The invention is described below with reference to two embodiments which are shown in the attached drawing, in which.

DETAILED DESCRIPTION OF THE INVENTION

Figure 1:
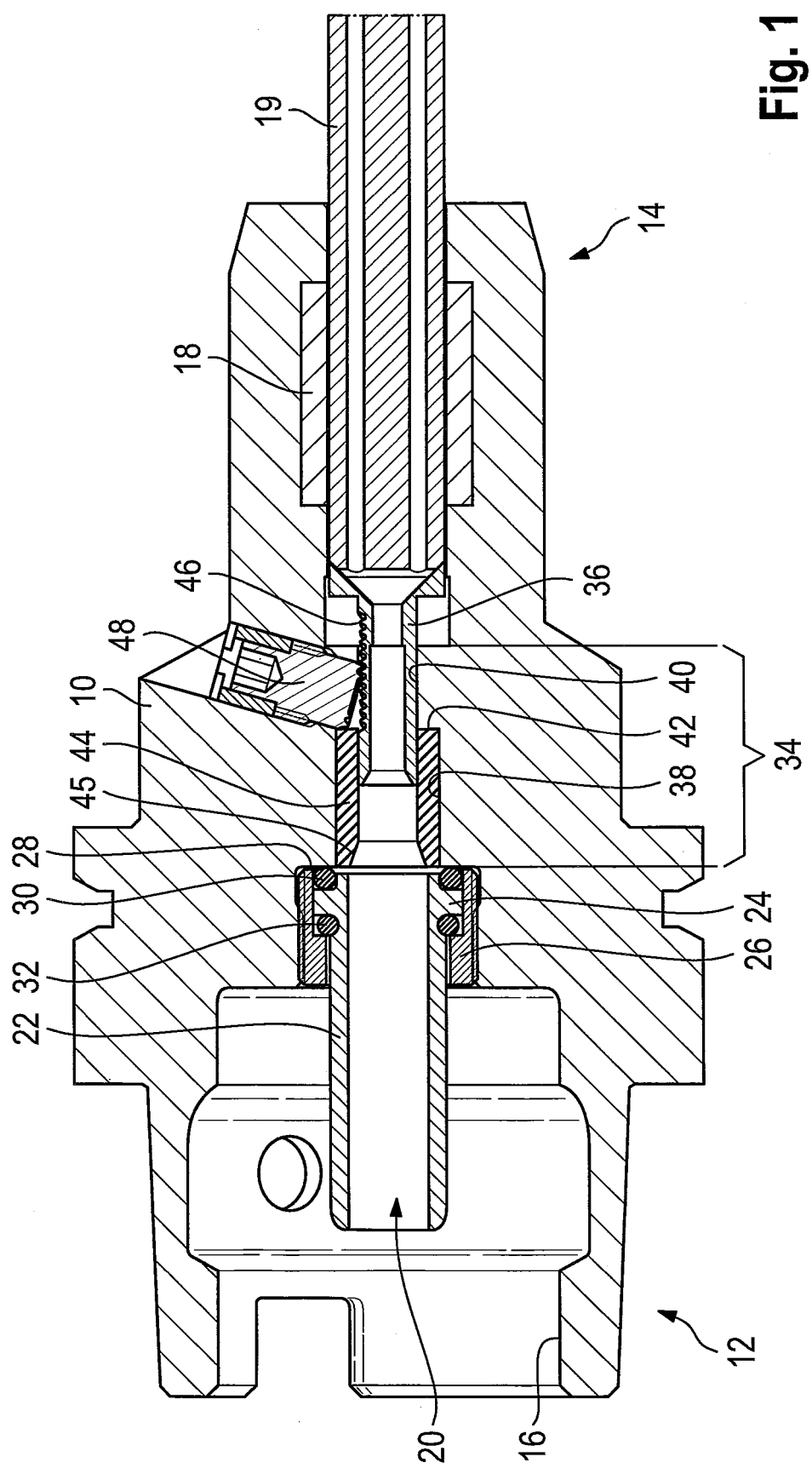
FIG. 1 shows a schematic section of a tool holder according to a first embodiment of the invention.

The tool holder shown in FIG. 1 contains a body 10 which has a spindle side 12 and a tool side 14. The spindle side 12 is embodied as a mechanical connection 16, with which the body 10 of the tool holder can be fixedly attached to a machine tool. The tool side 14 contains a hydraulic expansion chuck 18 (not shown here in detail) in which a schematically shown tool 19 can be clamped in place.

From the interior of the mechanical connection 16, that is to say from the spindle side 12 of the body 10, a lubricating media passage 20 extends toward the tool side 14, that is to say up to the tool 19 which is clamped in place in the expansion chuck 18. On the spindle side 12, the lubricating media passage 20 is formed in a transfer unit 22, of which one end opens inside the mechanical connection 16 and the other end of which is fixedly accommodated in the body 10. For this purpose, a collar 24 projecting axially outward is provided on that end of the transfer unit 22 which is accommodated in the body 10, and a screw sleeve 26 overlaps said collar 24. The screw sleeve 26 engages in an internal thread in the body 10 and can press the transfer unit 22 in the axial direction against a shoulder 28 which is provided at the base of the internal thread. Arranged in this case between the shoulder 28 and the collar 24 of the transfer unit 22 is a sealing ring 30 which together with a second sealing ring 32 which is arranged between the collar 24 and the screw sleeve 26 provides for the sealing of the transfer unit 22 relative to the body 10.

Formed in the body in the axial direction "behind" the shoulder 28 is a guide 34 in which a lubricating media bush 36 is arranged. In this case, the guide 34 consists of a sealing section 38 and a fitting section 40. The sealing section 38 is embodied as a cylindrical bore, the diameter of which is greater than the diameter of the fitting section 40. A step 42 extending in the radial direction is therefore formed between the sealing section 38 and the fitting section 40.

A seal 44 which is embodied as a hollow cylinder is arranged in the sealing section 38. The seal 44 can be made of rubber, elastomer or a similar suitable material. In this case, that end of the seal 44 which faces the transfer unit 22 is widened in a funnel shape (see the bevel 45), such that the diameter at the inlet of the seal 44 is equal to the diameter at the outlet of the transfer unit 22. At the same time, the length of the seal 44 is matched to the length of the sealing section 38 in such a way that the seal 44 is held with slight prestress in the axial direction by the transfer unit 22. At the same time, the diameter of the sealing section 38 is slightly smaller than the outside diameter of the seal 44, such that the latter, in a similar manner as in an interference fit, is held with slight prestress in the sealing section 38. Alternatively, the seal 44 can be fastened in the sealing section 38 by, for example, adhesive bonding or the like.

The lubricating media bush 36 is likewise embodied as a hollow cylinder, wherein, in a similar manner to the seal, that end of the lubricating media bush 36 facing the transfer unit 22 is widened in a funnel shape or conically. On the opposite side, the lubricating media bush 36 is mechanically guided in the fitting section 40 in such a way that it is displaceable in the axial direction. With its end which faces the transfer unit 22, the lubricating media bush 36 reaches into the interior of the seal 44. In this case, the outside diameter of the lubricating media bush 36 is matched to the inside diameter of the seal 44 in such a way that a portion of the seal 44 bears tightly and fixedly against the outer surface of the lubricating media bush 36. However, the bearing force is not so great that the lubricating media bush 36 could not be adjusted in the axial direction.

An important function of the lubricating media bush consists in the fact that it constitutes an axial, adjustable stop for the tool accommodated in the tool holder. The axial position of the tool can be established by the suitable positioning of the lubricating media bush, such that said tool, for example after a regrind, positioned again in such a way that the cutting edges of the tool are located in a desired axial position. An adjusting mechanism is provided for adjusting the lubricating media bush 36, said adjusting mechanism having a tooth system 46 on the outer surface of the lubricating media bush 36 and an adjusting screw 48. The adjusting screw 48 is accommodated in the body 10 in a slightly oblique but substantially radially oriented position and engages with its front end in the tooth system 46 of the lubricating media bush 36. The lubricating media bush 36 is displaced in the axial direction by turning the adjusting screw 48. As a result, contact of the tool-side end of the lubricating media bush 36 with different tools can be ensured. The dimensions of the seal 44 and of the lubricating media bush 36 are such that it is ensured that a certain minimum overlap with the seal 44 is maintained over the entire adjusting range.

The combination of the sealing section 38 and the fitting section 40 of the guide 34, which are arranged one behind the other in the axial direction, ensures overall sealing of the adjustable lubricating media bush 36, which reliably prevents the undesirable escape of MQL medium. Self-amplification of the sealing effect is especially advantageous in this case. While a portion of the seal 44 engages the lubricating media bush 36, a remaining portion of the seal 44 lying upstream of that end of the lubricating media bush 36 which faces the transfer unit 22 is exposed to the lubricating media pressure. If the pressure increases, the material of the seal is pressed elastically outward. This leads to a slight displacement of the seal material, as a result of which the contact pressure in the region where contact takes place with the outer surface of the lubricating media bush 36 increases.

It is especially advantageous that the lubricating media passage 20 does not increase in diameter along the path from the spindle side 12 to the tool side 14, but rather either remains constant in diameter (as within the transfer unit 22, along part of the seal 44 and within the lubricating media bush 36) or decreases in diameter (for example at the inlet of the seal 44 and at the inlet of the lubricating media bush 36). This ensures that there are no regions in the lubricating media passage at which the flow velocity of the lubricating medium suddenly decreases. If this were the case, the deposition of lubricant droplets in these regions could not be reliably prevented.

By way of example, suitable dimensions of the lubricating media passage 20 are as follows: the passage through the transfer unit 22 has an inside diameter of 8 mm. The lubricating media bush 36 has an outside diameter of 6 mm and an inside diameter of about 3.5 mm. The seal 44 has an outside diameter of 10 mm and a length of 14 mm. The sealing section 38 has an inside diameter of 9.9 mm, such that the seal 44 is accommodated in the sealing section 38 in the manner of an interference fit. Therefore the inside diameter of the seal 44, which is 6 mm in the initial state, is already narrowed slightly, such that there is a certain prestress with the outer surface of the lubricating media bush 36.

Figure 2:
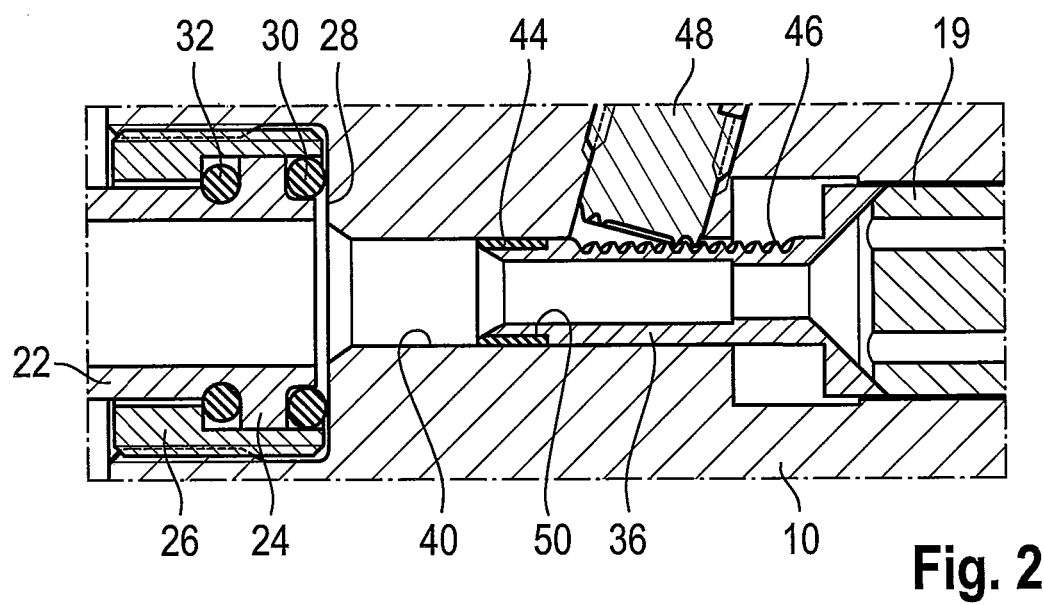
FIG. 2 shows an enlarged detail of a tool holder according to a second embodiment of the invention.

FIG. 2 shows a second embodiment, which differs from the first embodiment in that the sealing is not effected between the axially adjustable lubricating media bush 36 and the seal 44 but rather between the seal fixedly attached to the lubricating media bush 36 and the body 10. In principle, the same reference numerals are used in the second embodiment for the components which are known from the first embodiment, and in this respect reference is made to the above explanations.

Here, the seal 44 is attached to the outer side of the lubricating media bush 36, specifically to a receptacle 50 which is embodied as a section of reduced diameter on the spindle-side axial end of the lubricating media bush 36. This receptacle is open on the spindle side 12 and ends at a step, behind which the outer surface of the lubricating media bush 36 starts, the latter being accommodated in the fitting section 40 of the body 10. In the unfitted initial state, the seal 44 projects slightly beyond the outer surface of the lubricating media bush, such that it is accommodated with prestress in the guide 34 in the fitted state.

The seal is fixedly fastened in the receptacle 50, for example vulcanized in place. Alternatively, it can also be adhesively bonded in place. It is in principle also possible to fixedly fasten it mechanically by a retaining ring or to embody the receptacle as a groove which has a step in the axial direction on both sides.

If the lubricating media bush 36 is adjusted in the axial direction, the seal 44 slides in the fitting section 40 of the body and ensures reliable sealing there.

A feature common to both embodiments is that the sealing is effected directly between the body 10 and the adjustable lubricating media bush 36 by means of the seal 44, which is in contact with both the body 10 and the lubricating media bush 36. This permits simpler and more reliable sealing than in embodiments in which the lubricating media bush extends right into the transfer unit and is sealed there, since according to the invention fewer components participate in the sealing, as a result of which smaller tolerances can occur.

The invention claimed is:

1. A tool holder comprising a body which has a spindle side for fastening the tool holder to a spindle of a machine tool and a tool side for accommodating a tool and comprising a lubricating media passage from the spindle side downstream to the tool side, wherein a lubricating media bush adjustable in the axial direction is arranged in the body, said lubricating media hush opening out on the tool side of the body, wherein a guide for the lubricating media bush is provided in the body, said guide containing a fitting section in which the lubricating media bush is adjustably guided, wherein a seal is provided which seals the lubricating media bush relative to the body;
wherein the seal is a hollow cylinder and is fixedly arranged in the body and wherein the lubricating media bush is engaged by a portion of the seal in an axially displaceable manner and wherein the lubricating media passage extends therethrough; and
wherein a remaining portion of the seal lies upstream of the lubricating media bush such that when the pressurized lubricant is introduced into the lubricating media passage, the remaining portion of the seal is pressed elastically outward and deforms the engaged portion of the seal to provide a tighter seal between the engaged portion and the lubricating media bush.

2. The tool holder as claimed in claim 1, wherein the guide also contains a sealing section which is stepped relative to the fitting section and in which the seal is accommodated.

3. The tool holder as claimed in claim 2, wherein the seal is restrained against a radially extending step which is provided between the sealing section and the fitting section of the guide.

4. The tool as claimed in claim 1, wherein the outer surface of the seal is clamped directly into the sealing section.

5. The tool holder as claimed in claim 1, wherein the lubricating media passage within the seal is widened in a funnel shape on the spindle side.

6. The tool holder as claimed in claim 1, wherein the seal is fixedly mounted on the lubricating media hush and seals with respect to the body.

7. The tool holder as claimed in claim 6, wherein the seal is vulcanized onto the outer side of the lubricating media bush or is mechanically fastened onto the outer side of the lubricating media bush.

8. The tool holder as claimed in claim 1, wherein a transfer unit is provided which is fitted in the body and opens out on the spindle side.

9. The tool holder as claimed in claim 8, wherein a sealing ring is provided between the transfer unit and the body.

10. The tool holder as claimed in claim 9, wherein the seal is fixedly arranged in the body and seals with respect to the lubricating media bush, which is accommodated in the seal in an axially displaceable manner and wherein the diameter of the lubricating media passage within the transfer unit on the side facing the seal is at least as large as the diameter of the lubricating media passage within the seal on the side facing the transfer unit.

11. The tool holder as claimed in claim 8, wherein the seal is fixedly arranged in the body and seals with respect to the lubricating media bush, which is accommodated in the seal in an axially displaceable manner and wherein the diameter of the lubricating media passage within the transfer unit on the side facing the seal is at least as large as the diameter of the lubricating media passage within the seal on the side facing the transfer unit.

12. The tool holder as claimed in claim 1, wherein the lubricating media passage within the lubricating media bush is widened in a funnel shape at the spindle-side end.

13. The tool holder as claimed in claim 1, wherein the seal is made of an elastomer, rubber or a similar sealing material.

14. The tool holder as claimed in claim 1, wherein an adjusting mechanism is provided with which the lubricating media bush can be adjusted in the axial direction in the body.

15. The tool holder as claimed in claim 14, wherein the adjusting mechanism has a tooth system on the outer side of the lubricating media bush and an adjusting screw which engages in the tooth system.

16. The tool holder as claimed in claim 1, wherein the lubricating media passage has no widened portion at all from the spindle side of the tool holder to the tool side.

17. The tool holder as claimed in claim 1, wherein an expansion chuck is provided for accommodating the tool.

18. The tool holder as claimed in claim 1, wherein the mating of the seal and the lubricating media bush satisfies a standard defined by minimum quantity lubrication machining technology.

* * * * *